D. Bickford,
Sash Balance.

N° 20,857.      Patented July 13, 1858.

UNITED STATES PATENT OFFICE.

D. BICKFORD, OF WESTERLY, RHODE ISLAND.

SPRING-PULLEY FOR WINDOW-SASHES.

Specification of Letters Patent No. 20,857, dated July 13, 1858.

*To all whom it may concern:*

Be it known that I, DANA BICKFORD, of Westerly, in the county of Washington and State of Rhode Island, have invented a new and useful Improvement in Spring-Balances for Window-Sashes; and I do hereby declare that the following is a full, clear, and exact description of the same, reference being had to the accompanying drawings, forming a part of this specification, in which—

Figure 3:
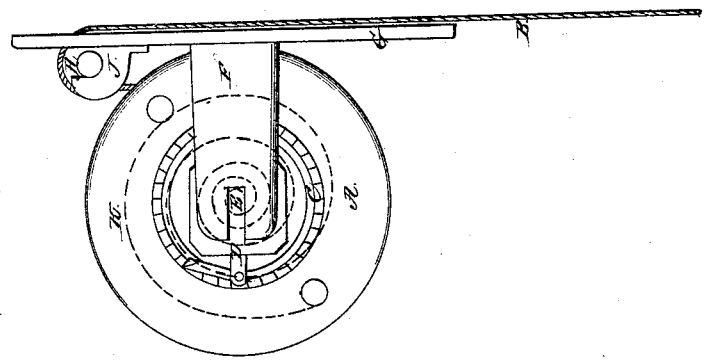
Figure 2:
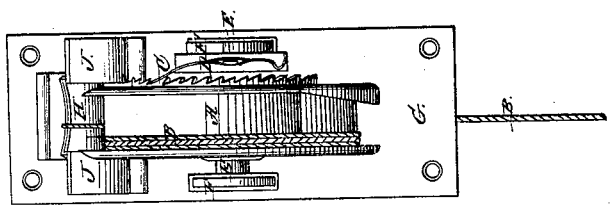
Figure 1:
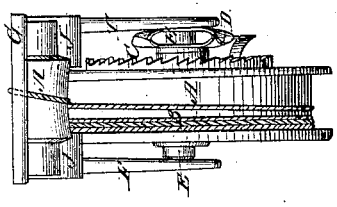

Figure 1 is an end view of a spring balance with my improvements, Fig. 2 is a top view, and Fig. 3 a side view.

Similar letters of reference indicate corresponding parts in each figure.

To enable others skilled in the art to make and use my invention, I will proceed to describe its construction and operation.

A is a spring case, arranged with a groove around it for the reception of the cord B, and with a ratchet C on the side for the purpose of turning the friction wheel or spring D.

E is the arbor that the spring case A turns on, and is supported by the posts F F, which are connected with the plate G.

H is a pulley that the cord passes over, and is supported by the bearings J J arranged with a lip that fits over the edge of the pulley to prevent the cord from running off at the ends of the pulley.

In the spring case A is a coiled spring as shown by the dotted lines K in Fig. 3, one end being connected with the case A, and the other with the arbor, which is stationary. By unwinding the cord B it winds up the spring K and turns the friction wheel D, at the same time. The use of this friction wheel is to prevent the sash from sagging when it is covered with ice or snow, it being arranged with a ratchet in such a manner as to turn when the sash is pulled down, and when the sash is raised the ratchet allows the spring case to run freely, and give the full force of the spring in raising the sash, thus producing a means of balancing the sash.

I do not claim either of these devices separately; but

What I do claim and wish to procure by Letters Patent is—

The combination of the friction wheel or its equivalent, and the bearings of the pulley with the lip as described in connection with other parts of the spring balance.

DANA BICKFORD.

Witnesses:
WARREN W. PAGE,
THOMAS B. NICHOLS.